United States Patent
Alic et al.

(10) Patent No.: US 11,632,191 B2
(45) Date of Patent: *Apr. 18, 2023

(54) INCREASE IN REACH OF UNREPEATERED FIBER TRANSMISSION

(71) Applicant: Raytheon Company, Waltham, MA (US)

(72) Inventors: Nikola Alic, La Jolla, CA (US); Vanessa Lynn Karr, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,148

(22) Filed: Jul. 30, 2021

(65) Prior Publication Data

US 2021/0359783 A1 Nov. 18, 2021

Related U.S. Application Data

(62) Division of application No. 16/657,776, filed on Oct. 18, 2019, now Pat. No. 11,095,395, which is a division of application No. 15/378,869, filed on Dec. 14, 2016, now abandoned.

(60) Provisional application No. 62/266,895, filed on Dec. 14, 2015.

(51) Int. Cl.
| | |
|---|---|
| *H04B 10/25* | (2013.01) |
| *H04J 14/02* | (2006.01) |
| *H04L 1/00* | (2006.01) |
| *H04B 10/2543* | (2013.01) |
| *H04B 10/50* | (2013.01) |
| *H04B 10/291* | (2013.01) |

(52) U.S. Cl.
CPC ......... *H04L 1/004* (2013.01); *H04B 10/2543* (2013.01); *H04B 10/2916* (2013.01); *H04B 10/506* (2013.01); *H04J 14/02* (2013.01); *H04B 2210/254* (2013.01)

(58) Field of Classification Search
CPC .......... H04B 10/25137; H04B 10/2543; H04B 10/58
See application file for complete search history.

(56) References Cited

U.S. PATENT DOCUMENTS

| | | |
|---|---|---|
| 6,785,456 B2 | 8/2004 | Bickham et al. |
| 7,559,590 B1 | 7/2009 | Bickham |
| 7,574,140 B2 | 8/2009 | Manna et al. |
| 7,665,909 B2 | 2/2010 | Perrier et al. |
| 8,126,338 B2 | 2/2012 | Wree et al. |

(Continued)

OTHER PUBLICATIONS

Kashyap et al., "Observation of castastrophic self-propelled self focusing in optical fibres", Electronics Letters, vol. 24, Issue 1, Jan. 7, 1988, pp. 47-49.

(Continued)

*Primary Examiner* — Nathan M Cors

(57) ABSTRACT

The present application is directed to techniques and systems for extension of unrepeatered submarine fiber links to provide an increase in reach of unrepeatered fiber transmission. Both single channel unrepeatered systems and multiple channel unrepeatered systems can be used. The multiple channel unrepeatered systems can further employ nonlinearity compensation. The present application is also directed to methods of signal transmission using the unrepeatered systems.

7 Claims, 4 Drawing Sheets

(56) References Cited

U.S. PATENT DOCUMENTS

| | | |
|---|---|---|
| 8,380,068 B2 | 2/2013 | Chang et al. |
| 8,538,218 B2 | 9/2013 | Bickham et al. |
| 9,184,848 B2 | 11/2015 | Willoughby et al. |
| 11,095,395 B2* | 8/2021 | Alic .................. H04J 14/02 |
| 2002/0067523 A1* | 6/2002 | Way .................. H04B 10/564 |
| | | 398/59 |
| 2002/0114608 A1 | 8/2002 | Maroney et al. |
| 2005/0025501 A1 | 2/2005 | Bickham |
| 2007/0223084 A1 | 9/2007 | Puc et al. |
| 2009/0285584 A1 | 11/2009 | Fevrier et al. |
| 2010/0028005 A1* | 2/2010 | Beckett ............. H04B 10/506 |
| | | 398/79 |
| 2010/0103957 A1* | 4/2010 | Fevrier .............. H01S 3/302 |
| | | 372/3 |
| 2011/0222863 A1 | 9/2011 | Bickham et al. |
| 2014/0064734 A1* | 3/2014 | Witzens ............. H04B 10/64 |
| | | 398/79 |
| 2014/0270757 A1 | 9/2014 | Van Lochem et al. |
| 2016/0043805 A1* | 2/2016 | Kakande ............ H04J 14/06 |
| | | 398/43 |
| 2017/0041078 A1* | 2/2017 | Le .................... H04B 10/6163 |

OTHER PUBLICATIONS

Eskilden et al., "Single fibre repeaterless transmission over 490 km at 2.488 Gbit/s using a remote preamplifier and dispersion compensation", Electronic Letters, vol. 32, Issue 18, Aug. 29, 1996, pp. 1696-1697.

\* cited by examiner

INCREASE IN REACH OF UNREPEATERED FIBER TRANSMISSION

CROSS-REFERENCE TO RELATED APPLICATIONS

This application is a Divisional Application of U.S. patent application Ser. No. 16/657,776 by Nikola Alic and Vanessa Lynne Karr, entitled "Increase in Reach of Unrepeatered Fiber Transmission," and filed on Oct. 18, 2019, which is Divisional Application of U.S. patent application Ser. No. 15/378,869 by Nikola Alic and Vanessa Lynne Karr, entitled "Increase in Reach of Unrepeatered Fiber Transmission," and filed on Dec. 14, 2016, which claims the benefit of U.S. Provisional Patent Application Ser. No. 62/266,895 by Nikola Alic and Vanessa Lynne Karr, entitled "Increase in Reach of Unrepeatered Fiber Transmission," and filed on Dec. 14, 2015, the contents of which are incorporated herein by this reference.

TECHNICAL FIELD

This invention is directed to techniques and systems for extension of unrepeatered submarine fiber links to provide an increase in reach of unrepeatered fiber transmission.

BACKGROUND

In contrast to amplified and regenerated submarine fiber transmission fiber, unrepeatered links have no active elements that are deployed in-line. While absence of the amplifier/regenerator element strictly limits the aggregate reach, such an all-passive link is not subject to dominant failure mechanisms that are associated with optical/electrical active components. Consequently, unrepeatered fiber transmission is highly reliable and, more importantly, easily serviced: any failure is confined to the end (launch/receive) points that are not submerged and are easily accessible.

In contrast, the failure in an amplified (regenerated) transmission link usually originates with degradation of in-line gain/regenerative element that cannot be serviced without submersible action and is subject to drastically different economy scales. To address this issue, commercial (repeatered) transmission relies on amplifiers whose performance (gain, bandwidth and noise figure) is traded for higher reliability. In practice, this also leads to sub-optimal capacity in all conventional, repeatered fiber links.

Therefore, there is a need for techniques that can provide an increase in reach of unrepeatered fiber transmission in order to increase capacity and reliability of fiber transmission without the necessity of employing active amplifier/regenerator elements.

SUMMARY

The present invention describes techniques and systems for increasing the reach of unrepeatered fiber transmission.

One aspect of the present invention is a single-channel unrepeatered system comprising:
(1) a transmitter;
(2) a transmitting side amplification system;
(3) a transmission line devoid of any inline lumped amplifiers;
(4) a receiving end amplification system; and
(5) a receiver.

In one alternative, the single-channel unrepeatered system operates with about 100 Watt (50 dBm) launch power. In one alternative, the single-channel unrepeatered system operates with a reach of from about 750 km to about 790 km.

The single-channel unrepeatered system can employ advanced higher-order Raman amplification designed to match increased signal launch power; in this alternative, the system can operate with a reach of at least about 1400 km.

Typically, the single-channel unrepeatered system employs an OOK channel of from about 10 Gbps to about 100 Gbps, such as an OOK channel of 10 Gbps, 20 Gbps, 30 Gbps, 40 Gbps, 50 Gbps, 60 Gbps, 70 Gbps, 80 Gbps, 90 Gbps, or 100 Gbps.

In one alternative, the channel fiber bandwidth is broadened in a multiple of the fiber-native Brillouin bandwidth (20 MHz).

In one alternative, the launched channel is pre-distorted to account for self-phase-modulation (SPM), intra-channel mixing, dispersive broadening and Raman-induced depletion. Typically, pre-distorting of the launched channel is performed by a method selected from the group consisting of: (i) inverting the solution of the nonlinear Schrödinger equation (NLSE) that describes single channel evolution over the unrepeatered link; (ii) implementing analytic approximation of a single channel evolution in a dispersive, lossy line; and (iii) choosing a choosing the specific bit-slot waveform shaping with highest stability with respect to nonlinear distortion, at given channel rate (speed) and launch power. Alternatively, pre-distorting of the launched channel is performed by selecting the soliton order and subsequently pre-distorting the launch waveform to minimize nonlinear-dispersive distortion. In another alternative, pre-distorting of the launched channel is performed by inverting the solution of the nonlinear Schrödinger equation (NLSE) that describes single channel evolution over the unrepeatered link and wherein inversion of the NLSE occurs at the receiver when the launched wave comprises an undistorted bit stream (post-compensation) or the combination of two (pre- and post-distortion).

The single-channel unrepeatered system of claim 1 can employ a parametric frequency comb.

Another aspect of the invention is a multiple-channel unrepeatered system comprising:
(1) a transmitter bank comprising multiple transmitters corresponding to a multitude of channels that are to be transmitted over the link generating and optionally pre-processing the information to be transmitted through the transmission link;
(2) a wavelength division multiplexer that joins the transmitters and launches them into the transmission link;
(3) a transmitting side amplification system;
(4) a transmission link devoid of any inline lumped amplifiers;
(5) a receiving side amplification system;
(6) a wavelength division de-multiplexer used to disjoin/separate the transmitted optical channels and route them to their corresponding receivers; and
(7) a plurality of receivers each of which is used to receive, process and detect the information on one or more channels transmitted to the transmission link.

The information that is to be transmitted through the transmission link can be pre-processed.

In one alternative, the plurality of different receivers in step (7) is replaced or partially replaced by a multiple-channel processing receiver. The multiple-channel processing receiver can replace some of the plurality of receivers or all of the plurality of receivers. The multiple-channel processing receiver can perform coherent summing to discriminate noise and increase the received SNR.

The multiple-channel unrepeatered system can employ advanced higher-order Raman amplification designed to match increased signal launch power. The multiple-channel unrepeatered system can employ a parametric frequency comb.

Yet another aspect of the invention is a multiple-channel unrepeatered system comprising:

(1) input data to be transmitted through the link;
(2) a nonlinearity pre-compensation block computing or estimating the waveform shapes to be imprinted onto the transmitted channels leading to the effective partial or complete cancellation of the nonlinear interaction in propagation;
(3) per wavelength-division multiplex channel computed waveforms;
(4) a bank of waveform generators used to imprint the channels' waveforms onto the transmitted optical field;
(5) a bank of corresponding optical transmitters;
(6) a wavelength division multiplexer joining the distinct transmitters and launching the generated channels into a single transmission link;
(7) a transmitter side optical amplification system;
(8) a transmission link devoid of inline lumped amplifiers;
(9) a receiver side optical amplification system;
(10) a wavelength division de-multiplexer used to separate the WDM channels and route them to their corresponding receivers;
(11) a plurality of receivers each of which being used to receive, process and detect the information on one or more channels transmitted to the transmission link;
(12) a nonlinearity post-compensating block used for partial or complete cancellation of the nonlinear interaction in propagation by processing the received information bearing waveforms or their sub-sampled versions; and
(13) received data obtained after processing away nonlinear impairment.

In this alternative, the received data can undergo additional processing by at least one technique selected from the group consisting of clock recovery, carrier phase recovery, frequency offset removal, equalization, and error control decoding.

In this alternative a single channel information can be copied to multiple carriers that occupy a set of wavelength-nondegenerate positions, or all transmitted wavelengths within the fiber transmission window.

Nonlinear distortion originating from intra-channel and inter-channel interaction can be mitigated by a technique selected from the group consisting of: (a) inverting the NLSE that describes the interaction of all channels; (b) inverting the NLSE that describes the interaction of the channel subset; and (c) any other predistortion technique that relies on knowledge of fiber physical characteristics and channel bit-history.

A subset of the channel information can be copied to multiple carriers occupying a set of wavelength-nondegenerate positions within the fiber transmission window. When this procedure is employed, typically, the selection of fractional data information that needs to be distributed to a specific wavelength carrier is specifically performed in order to: (i) minimize nonlinear inter-channel interaction; and (ii) minimize the complexity of predistortion algorithm used to form the launch waveform or invert the NLSE at the receiver.

In one alternative, the channel information is shared among all wavelength carriers but is encoded by different symbolic or physical means. For example, the channel information can be encoded by different symbolic means that include application of different forward-error correction codes (FEC) across the transmission window. As another example, the channel information is encoded by different physical means that include encoding distinct carriers by a wavelength-specific modulation format.

In one alternative, the plurality of different receivers in step (11) is replaced or partially replaced by a multiple-channel processing receiver. The multiple-channel processing receiver can replace some of the plurality of receivers or all of the plurality of receivers. The multiple-channel processing receiver can perform coherent summing to discriminate noise and increase the received SNR.

The multiple-channel unrepeatered system can employ advanced higher-order Raman amplification designed to match increased signal launch power. The multiple-channel unrepeatered system can employ a parametric frequency comb.

Another aspect of the invention is a method for transmitting a signal by means of a single channel unrepeatered system or a multiple channel unrepeatered system of the present invention as described above such that the transmitted signal is clearly received by a recipient in such a manner that the information original present in the signal is received by the recipient without significant distortion or loss. Typically, the transmitted signal is a digital signal representing text, a digital signal representing music, a digital signal representing video, a digital signal representing images, or a digital signal representing voice.

BRIEF DESCRIPTION OF THE DRAWINGS

The following invention will become better understood with reference to the specification, appended claims, and accompanying drawings, where:

DETAILED DESCRIPTION

Figure 1:
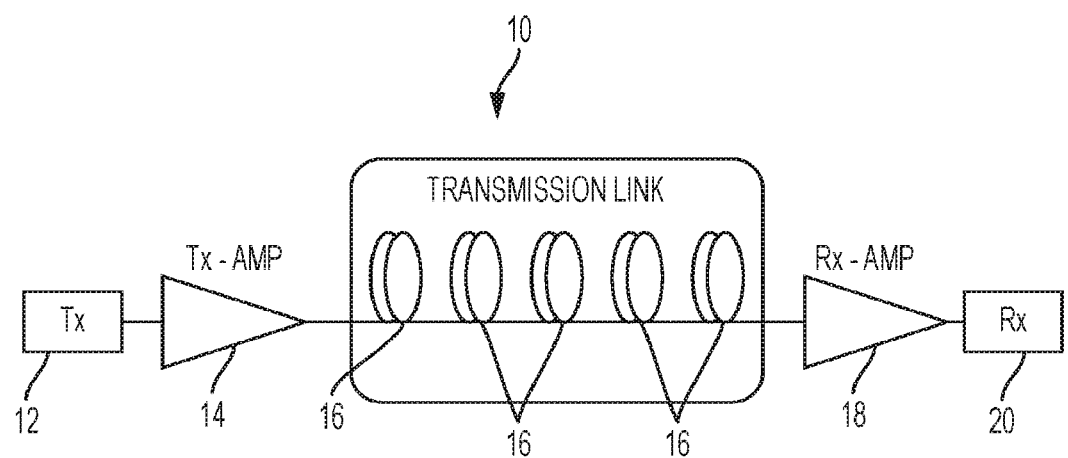
FIG. 1 shows a general single channel unrepeatered system consisting of: (1) transmitter; (2) transmitting side amplification system; (3) transmission link devoid of any inline lumped amplifiers; (4) receiving end amplification system; and (5) receiver.

The present invention describes alternatives for increasing the reach of unrepeatered fiber transmission without the necessity of introducing active amplifier/regenerator elements. These alternatives improve the distance over which signals can be propagated via unrepeatered fiber transmission while maintaining the superior reliability and signal-to-noise ratio (SNR) that are characteristic of unrepeatered fiber transmission.

The reach of unrepeatered transmission is strictly defined by the launch power into the fiber that can still result in reliable data recovery at the receiver node. In practical terms, conventional fiber loss is approximately 0.22 dB/km, while an advanced receiver equipped with forward-error correction (FEC) operating at 10 GHz has sensitivity of approximately −60 dBm. Currently deployed submarine links utilize launch power of approximately −5 dBm, allowing the reach of 55 dB/0.22 dB/km or about 250 km. By adding distributed (Raman) and lumped (EDFA) gain elements at both ends of the link and using state-of-the art fiber (~0.15 dB/km), this reach can be approximately doubled.

To extend the reach further, it is necessary to increase that launch power and trade it directly against additional link loss. If we assume a conservative launch power density of ~TW/m$^2$, this also means that state-of-the-art (SoA), low-loss transmission fiber with the effective area of ~130 μm$^2$ can accept ~100 Watt (50 dBm) launch power. When combined with SoA fiber loss (~0.14 dB/km), this means that unrepeatered reach can be extended to nearly 800 km (such as from 750 km to 790 km), before any distributed amplification is used. With addition of advanced (higher-order) Raman amplification, this reach can be nearly doubled to exceed 1400 km for a 10G bps on-off keying (OOK) channel, before any wavelength-division multiplexing (WDM) is used. By launching multiple WDM channels that can carry different, complementary or identical information, this reach can be extended further.

While having obvious benefits, the increased launch power is prohibited in SoA links since: (a) Brillouin scattering sets strict limit, well under a Watt for continuous-wave (CW) signal and (b) Kerr nonlinearities induces distortions that render received data unrecoverable. Brillouin scattering is associated with the nonlinearity of a medium, in particular with respect to spatial or temporal variations in refractive index. Kerr nonlinearities are associated with variations in refractive index induced by an electric field that is due to the light itself being transmitted. Both Brillouin scattering and Kerr nonlinearities can degrade data quality.

To address the former, it is necessary to broaden the channel physical bandwidth in multiples of fiber-native Brillouin bandwidth (20 MHz). As an example, a 10 Gbps OOK channel provides 10 GHz/20 MHz=500 times increase in the Brillouin threshold; a 100 Gbps OOK channel increases this power by an additional order of magnitude. However, even if the physical bandwidth of the channel is increased, either by bit-coding or phase-dithering that does not carry useful information, Kerr nonlinearity will destroy the integrity of the signal. Indeed, the combined action of wider physical bandwidth and higher optical power will lead to channel destruction well before reaching the receiver, even in case of a single-channel link.

Consequently, to engineer an unrepeatered fiber link with extended reach, it is necessary to: (1) suppress nonlinear distortion at higher launch powers; (2) in some alternatives, use higher-order Raman (distributed) amplifiers designed to match increased signal launch power; (3) in some alternatives, use a multi-channel processing receiver.

1. Suppression of Nonlinear Distortion at Higher Launch Powers

For suppression of nonlinear distortion at higher launch powers, a fiber link operating with a single channel must be treated differently from a multiple-channel (WDM) launch.

a. Single-Channel Nonlinear Cancellation

The launched channel has to be pre-distorted to account for self-phase-modulation (SPM), intra-channel mixing, dispersive broadening and Raman-induced depletion. The simplest, and not necessarily optimal method, is to invert the solution of the nonlinear Schrödinger equation (NLSE) that describes single channel evolution over the unrepeatered link. Another solution would be to implement analytic approximation of a single channel evolution in a dispersive, lossy line. Yet another solution would be choosing the specific bit-slot waveform shaping with highest stability with respect to nonlinear distortion, at given channel rate (speed) and launch power. An example (but not complete set) of such a solution would be to select the soliton order and subsequently pre-distort the launch waveform to minimize nonlinear-dispersive distortion. Alternatively, the inversion of NLSE can occur at the receiver when the launched wave comprises an undistorted bit stream (post-compensation) or the combination of two (pre- and post-distortion).

b. Multiple-Channel Nonlinear Cancellation (1) Copying of Channel Information to Multiple Carriers Channel information is copied to multiple carriers that occupy a set of wavelength-nondegenerate positions within the fiber transmission window. WDM transmission of high power channels is subject to nonlinear distortion originating from intra-channel and inter-channel interaction. Both can be mitigated by: (a) inverting the NLSE that describes the interaction of all channels; (b) inverting the NLSE that describes the interaction of the channel subset; or (c) any other predistortion technique that relies on knowledge of fiber physical characteristics and channel bit-history.

(2) Copying a Subset of Channel Information to Multiple Carriers

A subset of the channel information is copied to multiple carriers occupying a set of wavelength-nondegenerate positions within the fiber transmission window. The selection of fractional data information that needs to be distributed to a specific wavelength carrier is specifically performed in order to: (a) minimize nonlinear inter-channel interaction; and (b) minimize the complexity of predistortion algorithm used to form the launch waveform or invert the NLSE at the receiver.

(3) Sharing Channel Information Among All Wavelength Carriers with Different Encoding In another alternative, the channel information is shared among all wavelength carriers but is encoded by different symbolic or physical means. An example of different symbolic encoding includes application of different forward-error correction codes (FEC) across the transmission window; an example of different physical means includes encoding distinct carriers by a wavelength-specific modulation format. The purpose of both techniques is to minimize algorithmic expense necessary to invert nonlinear cancelation and to increase practical launch power under which data still can be recovered.

2. Use of Higher-Order Raman Amplifiers

Higher-order Raman (distributed) amplifiers designed to match increased signal launch power can be used. In conventional unrepeatered links, higher-order Raman amplification is specifically designed to provide optical transparency deep into the transmission line. One of the critical limitations is that Raman pump cannot exceed maximal power. If Raman amplifier is pumped by excessive power and the signal power is too low, then created gain results in generation of excess noise that reduces signal-to-noise ratio (SNR). The detrimental effect of low launch signal power also limits remotely optically pumped amplifier (ROPA). When signal power is too low, the pump power is expended on generation of amplified spontaneous emission (ASE), resulting in SNR loss. Consequently, the ability to launch higher optical power also means that both distributed and lumped amplifiers can be engineered to higher (gain/noise) performance and provide additional link margin with respect to the conventional link.

3. Use of Multiple-Channel Processing Receiver

In a conventional unrepeatered link, the launch of a single-channel is preferred over multiple-channel (WDM) link since inter-channel nonlinear interaction can negate the benefit from replicating or sharing information among wavelength-nondegenerate carriers. In contrast, by denying any nonlinear penalty, multiple channels can be coherently summed to discriminate noise, increasing the received SNR. In one embodiment, if N identical channels are received in such manner, the SNR will be increased (in linear terms) by N-fold. In another embodiment, if N wavelength carriers are encoded in order to maximize noise discrimination by sharing partial data among the carriers, the SNR can be higher than N-fold.

Accordingly, one aspect of the present invention is a single-channel unrepeatered system comprising:
(1) a transmitter;
(2) a transmitting side amplification system;
(3) a transmission line devoid of any inline lumped amplifiers;
(4) a receiving end amplification system; and
(5) a receiver.

This single-channel unrepeatered system is shown in FIG. 1. In FIG. 1, the system 10 includes the transmitter 12, the transmitting side amplification system 14, the transmission line 16, the receiving end amplification system 18, and the receiver 20.

In one alternative, this single-channel unrepeatered system operates with about 100 Watt (50 dBm) launch power.

In one alternative, this single-channel unrepeatered system operates with a reach of from about 750 km to about 790 km.

In another alternative, this single-channel unrepeatered system employs advanced higher-order Raman amplification designed to match increased signal launch power. In this alternative, the system typically operates with a reach of at least about 1400 km.

The single-channel unrepeatered system can employ an OOK channel of from about 10 Gbps to about 100 Gbps, such as 10 Gpbs, 20 Gbps, 30 Gbps, 40 Gbps, 50 Gbps, 60 Gbps, 70 Gbps, 80 Gbps, 90 Gbps, or 100 Gbps. Typically, the channel fiber bandwidth is broadened in a multiple of the fiber-native Brillouin bandwidth (20 MHz).

In one alternative, for a single-channel unrepeatered system, the launched channel is pre-distorted to account for self-phase-modulation (SPM), intra-channel mixing, dispersive broadening and Raman-induced depletion. Pre-distorting of the launched channel can be performed by a method selected from the group consisting of: (i) inverting the solution of the nonlinear Schrödinger equation (NLSE) that describes single channel evolution over the unrepeatered link; (ii) implementing analytic approximation of a single channel evolution in a dispersive, lossy line; and (iii) choosing a choosing the specific bit-slot waveform shaping with highest stability with respect to nonlinear distortion, at given channel rate (speed) and launch power. In a preferred alternative, pre-distorting of the launched channel is performed by selecting the soliton order and subsequently pre-distorting the launch waveform to minimize nonlinear-dispersive distortion. When pre-distorting of the launched channel is performed by inverting the solution of the nonlinear Schrödinger equation (NLSE) that describes single channel evolution over the unrepeatered link, the inversion of NLSE can occur at the receiver when the launched wave comprises an undistorted bit stream (post-compensation) or the combination of two (pre- and post-distortion).

Another aspect of the present invention is a multiple-channel unrepeatered system comprising:
(1) a transmitter bank comprising multiple transmitters corresponding to a multitude of channels that are to be transmitted over the link generating and optionally pre-processing the information to be transmitted through the transmission link;
(2) a wavelength division multiplexer that joins the transmitters and launches them into the transmission link;
(3) a transmitting side amplification system;
(4) a transmission link devoid of any inline lumped amplifiers;
(5) a receiving side amplification system;
(6) a wavelength division de-multiplexer used to disjoin/separate the transmitted optical channels and route them to their corresponding receivers; and
(7) a plurality of receivers each of which is used to receive, process and detect the information on one or more channels transmitted to the transmission link.

Figure 2:
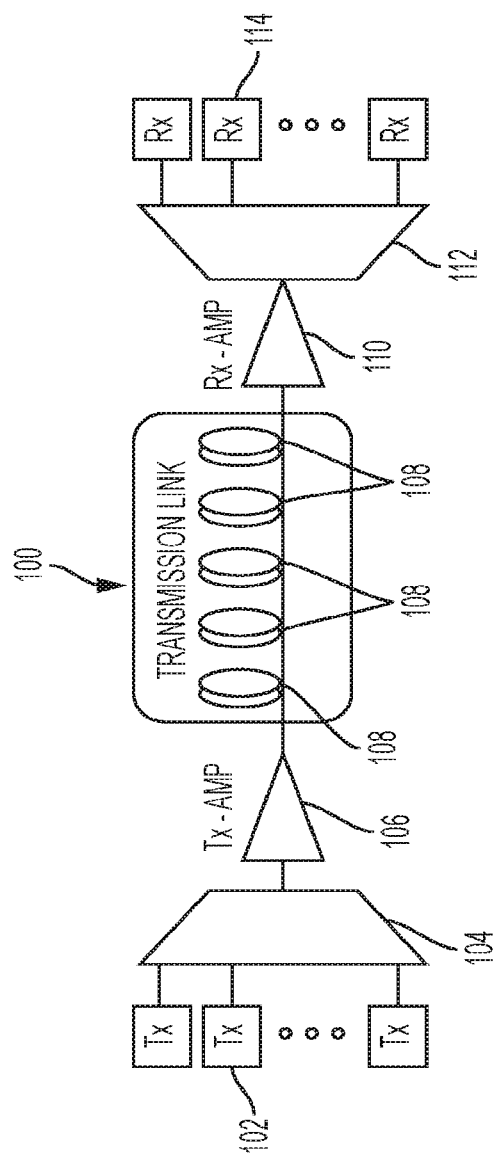
FIG. 2 shows a multi-channel unrepeatered transmission system consisting of: (1) transmitter bank, i.e. multiple transmitters corresponding to a multitude of channels that are to be transmitted over the link generating and possibly pre-processing the information to be transmitted through the transmission link; (2) a wavelength division multiplexer that joins the transmitters and launches them into the transmission link; (3) transmitting side amplification system; (4) transmission link devoid of any inline lumped amplifiers; (5) receiving side amplification system; (6) wavelength division de-multiplexer used to disjoin/separate the transmitted optical channels and route them to their corresponding receivers; and (7) a plurality of receivers each of which is used to receive, process and detect the information on one or more channels transmitted to the transmission link.

This multiple-channel unrepeatered system is shown in FIG. 2. In FIG. 2, the system 100 includes the transmitter bank 102, the multiplexer 104, the transmitting side amplification system 106, the transmission line 108, the receiving side amplification system 110, the de-multiplexer 112, and the plurality of receivers 114.

In one alternative, the information that is to be transmitted through the transmission link is pre-processed. Pre-processing can be performed by techniques known in the art such as filtering to remove noise or interference.

Yet another aspect of the present invention is a multiple-channel unrepeatered system employing nonlinearity compensation comprising:
(1) input data to be transmitted through the link;
(2) a nonlinearity pre-compensation block computing or estimating the waveform shapes to be imprinted onto the transmitted channels leading to the effective partial or complete cancellation of the nonlinear interaction in propagation;
(3) per wavelength-division multiplex channel computed waveforms;
(4) a bank of waveform generators used to imprint the channels' waveforms onto the transmitted optical field;
(5) a bank of corresponding optical transmitters;
(6) a wavelength division multiplexer joining the distinct transmitters and launching the generated channels into a single transmission link;
(7) a transmitter side optical amplification system;
(8) a transmission link devoid of inline lumped amplifiers;
(9) a receiver side optical amplification system;
(10) a wavelength division de-multiplexer used to separate the WDM channels and route them to their corresponding receivers;
(11) a plurality of receivers each of which being used to receive, process and detect the information on one or more channels transmitted to the transmission link;
(12) a nonlinearity post-compensating block used for partial or complete cancellation of the nonlinear interaction in propagation by processing the received information bearing waveforms or their sub-sampled versions; and
(13) received data obtained after processing away nonlinear impairment (and, possibly additional processing such as, but not limited to clock recovery, carrier phase recovery, frequency offset removal, equalization, and error control decoding).

Figure 3:
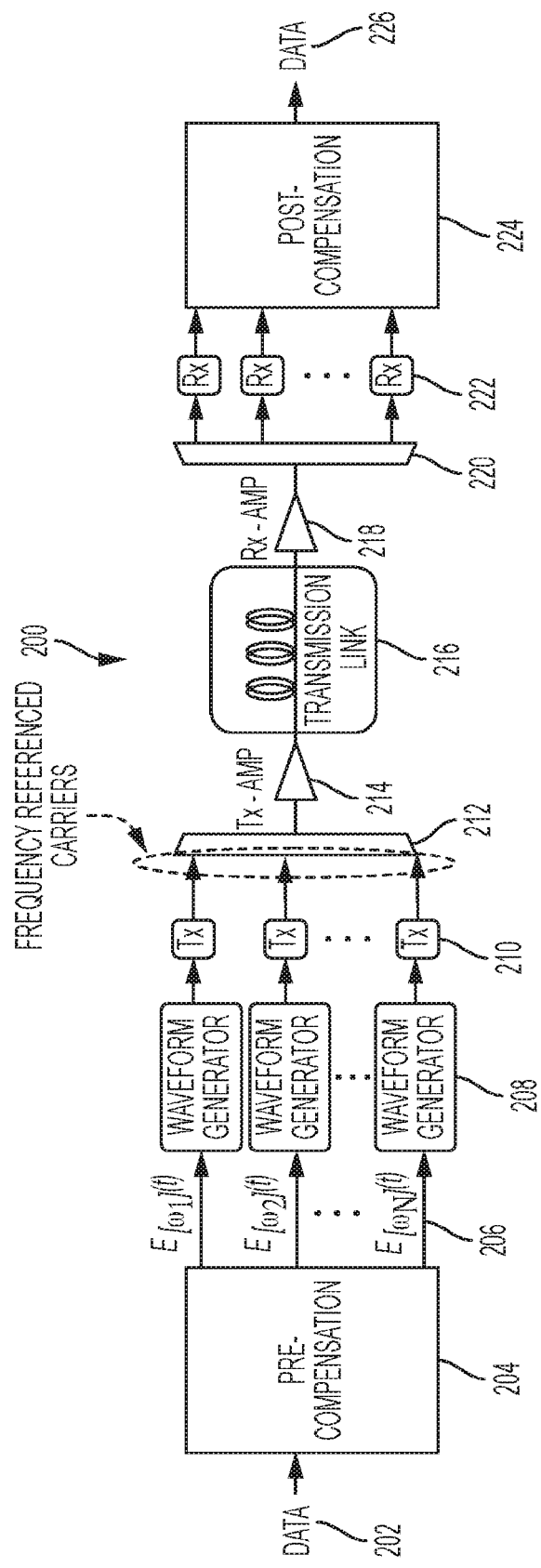
FIG. 3 shows a schematic of a multi-channel unrepeatered link with nonlinearity compensation consisting of: (1) input data to be transmitted through the link; (2) a nonlinearity pre-compensation block computing, or estimating the waveform shapes to be imprinted onto the transmitted channels leading to the effective partial or complete cancellation of the nonlinear interaction in propagation; (3) per wavelength-division multiplex channel computed waveforms; (4) a bank of waveform generators used to imprint the channels' waveforms onto the transmitted optical field; (5) a bank of corresponding optical transmitters; (6) a wavelength division multiplexer joining the distinct transmitters and launching the generated channels into a single transmission link; (7) transmitter side optical amplification system; (8) transmission link devoid of inline lumped amplifiers; (9) receiver side optical amplification system; (10) wavelength division de-multiplexer used to separate the WDM channels and route them to their corresponding receivers; (11) a multitude of receivers each of which being used to receive, process and detect the information on one or more channels transmitted to the optical line; (12) nonlinearity post-compensating block used for partial or complete cancellation of the nonlinear interaction in propagation by processing the received information bearing waveforms, or their sub-sampled versions; and (13) received data obtained after processing away the nonlinear impairment (and, possibly additional processing such as, but not limited to clock recovery, carrier phase recovery, frequency offset removal, equalization, error control decoding).

This multiple-channel unrepeatered system employing nonlinearity compensation is shown in FIG. 3. In FIG. 3, the system 200 includes the data 202, the pre-compensation block 204, the computed waveforms 206, the bank of waveform generators 208, the optical transmitters 210, the wavelength division multiplexer 212, the transmitter side optical amplification system 214, the transmission link 216, the receiver side amplification system 218, the de-multiplexer 220, the receivers 222, the post-compensation block 224, and the received data 226.

In this alternative, the input data and the received data is digital data that can be generated by any conventional digital data generation technique. In this alternative, the hardware components and connections can be hardware components and connections as generally known in the art.

In this alternative, the channel information can be copied to multiple carriers that occupy a set of wavelength-nondegenerate positions within the fiber transmission window.

In this alternative, nonlinear distortion originating from intra-channel and inter-channel interaction can be mitigated by a technique selected from the group consisting of: (a) inverting the NLSE that describes the interaction of all channels; (b) inverting the NLSE that describes the interaction of the channel subset; and (c) any other predistortion technique that relies on knowledge of fiber physical characteristics and channel bit-history.

In another alternative of this aspect of the invention, a single channel information is copied to multiple carriers that occupy a set of wavelength-nondegenerate positions, or all transmitted wavelengths within the fiber transmission window. Typically, in this alternative, the selection of fractional data information that needs to be distributed to a specific wavelength carrier is specifically performed in order to: (a) minimize nonlinear inter-channel interaction; and (b) minimize the complexity of predistortion algorithm used to form the launch waveform or invert the NLSE at the receiver.

In yet another alternative of this aspect of the invention, the channel information is shared among all wavelength carriers but is encoded by different symbolic or physical means. For example, symbolic encoding can include application of different forward-error correction codes (FEC) across the transmission window. For example, encoding by different physical means can include encoding distinct carriers by a wavelength-specific modulation format.

In an alternative embodiment of a multiple-channel unrepeatered system, the plurality of different receivers in Step (7) (for systems not employing nonlinearity compensation) or in Step (12) (for systems employing nonlinearity compensation) can be replaced or partially replaced by a multiple-channel processing receiver. The multiple-channel processing receiver can replace some or all of the plurality of receivers of those steps. The multiple-channel processing receiver can perform coherent summing to discriminate noise and increase the received SNR.

In yet another alternative of a multiple-channel unrepeatered system, either not employing nonlinearity compensation or employing nonlinearity compensation, a higher order Raman (distributed) amplifier designed to match increasing signal launch power is used.

Figure 4:
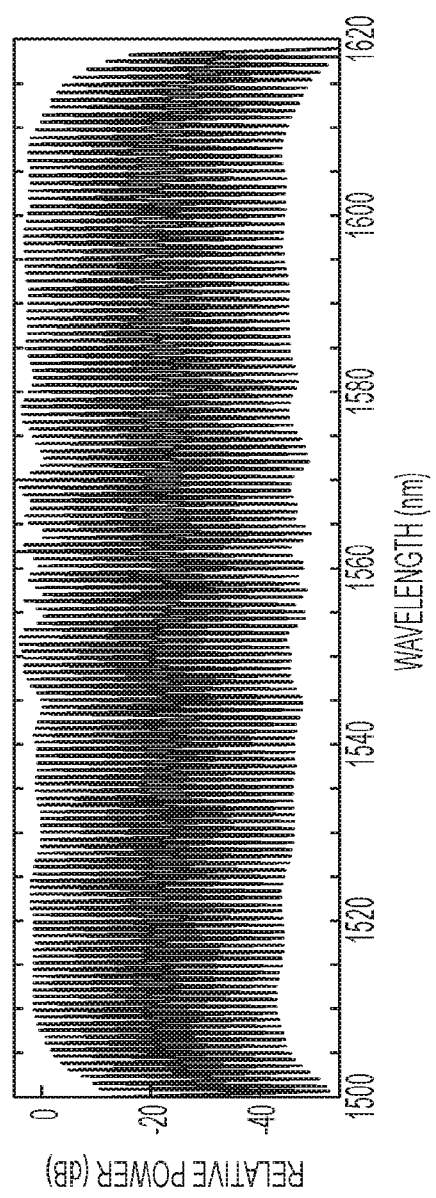
FIG. 4 shows an example of a parametric frequency comb—an optical source emitting a multitude of optical frequencies which can be used as either information carriers in transmission, or local oscillators in receivers.

A parametric frequency comb, as shown in FIG. 4, is an optical source emitting a multitude of optical frequencies which can be used as either information carriers in transmission, or local oscillators in receivers in systems according to the present invention.

Yet another aspect of the invention is a method for transmitting a signal by means of a single channel or multiple channel unrepeatered system as described above such that the transmitted signal is clearly received by a recipient in such a manner that the information original present in the signal is received by the recipient without significant distortion or loss.

The signal to be transmitted is any conventionally generated digital signal, such as a digital signal representing text, a digital signal representing music, a digital signal representing video, a digital signal representing images, or a digital signal representing voice.

ADVANTAGES

The present invention provides systems and methods to extend the range of unrepeatered fiber transmission without the use of active amplifier/regenerator elements. This improves the signal-to-noise ratio (SNR) and reliability of such transmission.

The present invention possesses industrial applicability as a system to extend the range of unrepeatered fiber transmission.

The claims of the present invention are directed to specific devices and systems that are more than general applications of laws of nature and require that those practicing the invention employ components or steps other than those conventionally known in the art, in addition to the specific applications of laws of nature recited or implied in the claims, and thus confine the scope of the claims to the specific applications recited therein. The specific devices and systems of the present invention require the use of specific hardware and involve specific processes involving the hardware that generate a change in physical state of the hardware and produce physical results.

The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein.

It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. The disclosures of all articles and references, including patent publications, are incorporated herein by reference.

What is claimed is:

1. A multiple-channel unrepeatered system comprising:
   a transmitter bank comprising multiple transmitters configured to generate optical signals containing information to be transmitted;
   a wavelength division multiplexer configured to combine the optical signals and produce a combined optical signal;
   a transmitting-side amplification system configured to amplify the combined optical signal and produce an outgoing optical signal;
   a transmission link devoid of any inline lumped amplifiers and configured to transport the outgoing optical signal;
   a receiving-side amplification system configured to receive the outgoing optical signal as an incoming optical signal, amplify the incoming optical signal, and produce an amplified incoming optical signal;
   a wavelength division de-multiplexer configured to disjoin/separate the optical signals contained in the amplified incoming optical signal and route the optical signals;
   multiple receivers each configured to receive, process, and detect the information in a first subset of the optical signals; and
   a multiple-channel processing receiver configured to receive, process, and detect the information in a second subset of the optical signals, the multiple-channel processing receiver further configured to perform coherent summing to discriminate noise and increase a received signal-to-noise ratio (SNR).

2. The multiple-channel unrepeatered system of claim 1, wherein the information contained in the optical signals is pre-processed.

3. The multiple-channel unrepeatered system of claim 1, wherein the system is configured to employ higher-order Raman amplification designed to match increased signal launch power.

4. The multiple-channel unrepeatered system of claim 1, further comprising a parametric frequency comb.

5. The multiple-channel unrepeatered system of claim 1, wherein the combined optical signal comprises a digital signal representing text, a digital signal representing music, a digital signal representing video, a digital signal representing images, or a digital signal representing voice.

6. A method comprising:
   receiving a transmitted optical signal from a multiple-channel unrepeatered system by a recipient such that information originally present in the transmitted optical signal is received by the recipient; wherein the multiple-channel unrepeatered system comprises:
   a transmitter bank comprising multiple transmitters configured to generate optical signals containing the information;
   a wavelength division multiplexer configured to combine the optical signals and produce a combined optical signal;
   a transmitting-side amplification system configured to amplify the combined optical signal and produce an outgoing optical signal, wherein the outgoing optical signal represents the transmitted optical signal;
   a transmission link devoid of any inline lumped amplifiers and configured to transport the outgoing optical signal;
   a receiving-side amplification system configured to receive the outgoing optical signal as an incoming optical signal, amplify the incoming optical signal, and produce an amplified incoming optical signal;
   a wavelength division de-multiplexer configured to disjoin/separate the optical signals contained in the amplified incoming optical signal and route the optical signals;
   multiple receivers each configured to receive, process, and detect the information in a first subset of the optical signals; and
   a multiple-channel processing receiver configured to receive, process, and detect the information in a second subset of the optical signals, the multiple-channel processing receiver further configured to perform coherent summing to discriminate noise and increase a received signal-to-noise ratio (SNR).

7. The method of claim 6, wherein the transmitted optical signal comprises a digital signal representing text, a digital signal representing music, a digital signal representing video, a digital signal representing images, or a digital signal representing voice.

* * * * *